(12) United States Patent
Cook et al.

(10) Patent No.: US 8,411,268 B2
(45) Date of Patent: Apr. 2, 2013

(54) TWO MATERIAL ACHROMATIC PRISM

(75) Inventors: Lacy G. Cook, El Segundo, CA (US);
John F. Silny, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 201 days.

(21) Appl. No.: 12/896,620

(22) Filed: Oct. 1, 2010

(65) Prior Publication Data

US 2012/0081705 A1   Apr. 5, 2012

(51) Int. Cl.
- *G01J 3/28* (2006.01)
- *G01J 5/02* (2006.01)
- *G01N 21/00* (2006.01)

(52) U.S. Cl. ................. 356/326; 356/72; 250/339.02
(58) Field of Classification Search .............. None
See application file for complete search history.

(56) References Cited

U.S. PATENT DOCUMENTS

| | | | |
|---|---|---|---|
| 2,628,156 A | 2/1953 | Merker et al. | |
| 2,972,277 A | 2/1961 | Siegler, Jr. et al. | |
| 3,900,263 A | 8/1975 | Hall, Jr. | |
| 4,101,195 A | 7/1978 | Korsch | |
| 4,265,510 A | 5/1981 | Cook | |
| 4,520,116 A | 5/1985 | Gentilman et al. | |
| 4,733,955 A | 3/1988 | Cook | |
| 4,791,427 A * | 12/1988 | Raber et al. | 343/754 |
| 4,826,313 A * | 5/1989 | Schar et al. | 356/51 |
| 4,834,517 A | 5/1989 | Cook | |
| 5,018,842 A | 5/1991 | Chen | |
| 5,260,767 A | 11/1993 | Cook | |
| 5,307,358 A | 4/1994 | Scheps | |
| 5,550,672 A | 8/1996 | Cook | |
| 5,779,038 A * | 7/1998 | Herr et al. | 206/308.2 |
| 5,781,290 A * | 7/1998 | Bittner et al. | 356/326 |
| 6,767,103 B2 | 7/2004 | Cook | |

(Continued)

FOREIGN PATENT DOCUMENTS

| | | |
|---|---|---|
| EP | 2437038 A1 | 4/2012 |
| WO | 98/37389 A1 | 8/1998 |

OTHER PUBLICATIONS

Marvin Weber, Handbook of Optical Materials, Sep. 2002, CRC Press, Chapter 2.*

(Continued)

*Primary Examiner* — Gregory J Toatley
*Assistant Examiner* — Shawn Decenzo
(74) *Attorney, Agent, or Firm* — Lando & Anastasi, LLP (57) ABSTRACT

A spectrometer comprises a detector array and a prism. The prism comprises a first prism element comprising a substantially crystalline crown material, and a second prism element contacting the first prism element, the second prism element comprising a substantially crystalline flint material. The spectrometer further includes optics configured to direct light at least twice through the prism. The prism is configured to disperse light received from the optics at an incident angle therethrough into constituent spectra in visible and infrared wavelength bands that are dispersed from the prism at angles offset from the incident angle. The constituent spectra are directed onto the detector array with approximately equal dispersion across the visible and infrared wavelength bands. Among other things, desirable material selections for the first and second prism elements are also disclosed.

14 Claims, 12 Drawing Sheets

U.S. PATENT DOCUMENTS

| | | | |
|---|---|---|---|
| 6,886,953 | B2 | 5/2005 | Cook |
| 6,919,988 | B2 | 7/2005 | Cook |
| 6,935,757 | B1 * | 8/2005 | Mooney et al. ............... 359/615 |
| 7,037,005 | B2 | 5/2006 | Kreger et al. |
| 7,649,035 | B2 | 1/2010 | Taima |
| 2002/0034149 | A1 | 3/2002 | Nishi |
| 2005/0046955 | A1 * | 3/2005 | Kim et al. ..................... 359/640 |
| 2005/0270912 | A1 * | 12/2005 | Sato et al. .................. 369/44.11 |
| 2008/0266687 | A1 | 10/2008 | Cook |

OTHER PUBLICATIONS

Nischan, M. L, et al., "Analysis of Hydice Noise Characteristics and Their Impact on Subpixel Object Detection", SPIE vol. 3753, pp. 112-113 (1999).

Richard, L. J., et al., "HYDICE: An airborne system for hyperspectral imaging", SPIE vol. 1937, pp. 173-179 (1993) (8 pages).

European Search Report dated Dec. 29, 2011 of EP Appln. No. 11179308.9 (7 pages).

* cited by examiner

FIG. 1

| LIGHT IMPACTING SURFACE | ELEMENT | IDENTIFIER IN FIG. 1 | BASE RADIUS Rd (cm) | CONIC CONSTANT | HIGHER ORDER ASPHERIC TERMS Ad | Ae | Af | Ag | Y DECENTER Yd (cm) | TILT ALPHA (DEGREES) | THICKNESS (cm) | MATERIAL TYPE |
|---|---|---|---|---|---|---|---|---|---|---|---|---|
| 1 | SLIT | 30 | INF. | | | | | | 4.988 | | -11.3392 | AIR |
| 2 | ENT. PUPIL | 40 | INF. | | | | | | 5.212 | -1.000 | 11.3392 | AIR |
| 3 | SLIT | 30 | INF. | | | | | | 4.988 | | 22.9903 | AIR |
| 4 | PRI. | 70 | -28.6381 | 0.384187 | 5.917E-07 | 5.472E-10 | 1.699E-12 | -9.702E-16 | 0.0333 | 0.98307 | -15.5390 | REFL |
| 5 | SEC. | 80 | -19.8215 | 0.639697 | -5.082E-07 | -6.991E-08 | 4.296E-10 | -6.840E-12 | -1.5211 | -0.79891 | 13.3300 | REFL |
| 6 | TERT. | 90 | -62.0362 | -1.34623 | -8.633E-08 | 4.560E-11 | 2.863E-13 | -2.679E-16 | 5.3344 | 5.3860 | -15.0005 | REFL |
| 7 | PRISM I | 110 | INF. | | | | | | -10.000 | 4.8247 | -1.9930 | SPINEL |
| 8 | | | INF. | | | | | | -10.000 | 25.1753 | 0 | |
| 9 | PRISM II | 120 | INF. | | | | | | -10.000 | 25.1753 | -0.7778 | AgCl |
| 10 | | | INF. | | | | | | -10.000 | 21.5040 | -1.5447 | |
| 11 | MIRROR | 130 | Cyl. | | | | | | -10.000 | -0.96645 | 1.5447 | REFL |
| 12 | PRISM II | 120 | INF. | | | | | | -10.000 | 21.504 | 0.7778 | AgCl |
| 13 | | | INF. | | | | | | -10.000 | 25.1753 | 0 | |
| 14 | PRISM I | 110 | INF. | | | | | | -10.000 | 25.1753 | 1.9930 | SPINEL |
| 15 | | | INF. | | | | | | -10.000 | 4.8247 | 15.0005 | |
| 16 | TERT. | 90 | -62.0362 | -1.34623 | -8.633E-08 | 4.560E-11 | 2.863E-13 | -2.679E-16 | 5.3344 | 5.3860 | -13.3300 | REFL |
| 17 | SEC. | 80 | -19.8215 | 0.639697 | -5.082E-07 | -6.991E-08 | 4.296E-10 | -6.840E-12 | -1.5211 | -0.79891 | 15.5390 | REFL |
| 18 | PRI. | 70 | -28.6381 | 0.384187 | 5.917E-07 | 5.472E-10 | 1.699E-12 | -9.702E-16 | 0.0333 | 0.98307 | -22.9903 | REFL |
| 19 | FOCUS | 140 | INF. | | | | | | 4.549 | | | AIR |

*Cyl Rd X-PLANE = -1798.67
*Cyl Rd Y-PLANE = INF.

ENT. PUPIL DIAMETER = 3.779
SPECTRAL BAND IS 0.40 TO 2.5 MICRONS
TOTAL SPACIAL FORMAT IS 6.00 X-PLANE
TOTAL DISPERSED SPECTRAL FORMAT IS 0.512 Y-PLANE

TOTAL Y-PLANE FORMAT IS 0.880
PARAXIAL OPTICAL SPEED IS F/3
PARAXIAL RT FOCAL LENGTH IS 24
PARAXIAL PUPIL AT SURF 11 IS 8

TWO MATERIAL ACHROMATIC PRISM

BACKGROUND

This disclosure relates generally to spectrally dispersive optical systems. More particularly, this disclosure relates to spectrometers utilizing two-material prism elements.

Numerous optical systems utilize the dispersion of light into constituent wavelength bands. Such dispersion is used for many purposes, including but not limited to spectrometry or other spectral analysis. The dispersion of light is conventionally achieved through a dispersive element, such as a diffraction grating or a prism.

Diffraction grating dispersive elements, which include single blaze-angle or multi-faceted (i.e. dual-blaze angle) gratings, utilize the periodic nature of the constituent material to separate out different wavelength bands of light as it intersects the blazing of the grating. Prisms, on the other hand, utilize the transition between materials, such as between air and the solid of the prism, to disperse the incident light. Prisms generally have the advantage of yielding a higher total throughput via their dispersion than a grating achieves through diffraction, particularly when operating over a spectral range that includes more than one octave (here an octave refers to a doubling in frequency). However, prisms may be more prone to certain distortions, as discussed below.

A prism utilizing only a single material yields a dispersion curve proportional to the change in the material's index of refraction versus wavelength. Typically this change in dispersion with wavelength is very large and acts as an unacceptable distortion. To counteract the unwanted distortion of some prisms, multiple elements of different materials (conventionally different types of glass) and/or different shapes may be joined and utilized to control the dispersion of different wavelength bands to reach a desired optical effect. The concept of utilizing multiple materials in prisms utilizes a high dispersion material (i.e. a "flint" glass) with a low dispersion material (i.e. a "crown" glass), to form an achromatic pair that allows control of the dispersion of different wavelengths of light, which may be optimized for particular optical systems. For example, two-material prisms may be configured to correct for undesired dispersion effects in the optical system. With prisms, one common undesired dispersion effect that may arise is a large variation from linearity of the spectral dispersion, which may result from the differing refractive indexes associated with different wavelengths of light in the optical elements.

In various situations, desired optical system specifications may prefer selection of systems that meet a particular spectral sampling interval (the spacing between sample points in a measured spectra). To achieve the desired sampling interval, the dispersive element may be configured to limit variance in detector bandwidth over a wide band of wavelengths. Such limited variance may be characterized by the system having a relatively linear or "flat" dispersion. To achieve relative flatness of dispersion in prism-based dispersive elements, designers may select from a large number of flint and crown materials, to construct a two-material achromatic prism. As one example of conventional material selection, some optical systems may utilize a two-glass prism having a fused quartz crown (an amorphous/glassy form of quartz, such as that distributed under the trademark INFRASIL®) and an SF1 flint (where SF1 is the SCHOTT glass designation for a common flint glass). Thus far, material selection for conventional two-material achromatic prisms for spectrometers have involved combining glassy materials based on empirical observations of their properties, and refining material selections based on the effectiveness of the combination.

What is needed is, among other things, improvements over known dispersive elements for spectroscopic purposes, wherein their constituent materials provide reduced variance of dispersion over a wide wavelength band.

SUMMARY

According to an embodiment, a spectrometer comprises a detector array and a prism. The prism comprises a first prism element comprising a substantially crystalline crown material, and a second prism element contacting the first prism element, the second prism element comprising a substantially crystalline flint material. The spectrometer further includes optics configured to direct light at least twice through the prism. The prism is configured to disperse light received from the optics at an incident angle therethrough into a constituent spectra in visible and infrared wavelength bands, the spectra being dispersed from the prism at angles offset from the incident angle. The constituent spectra are directed onto the detector array with approximately equal dispersion across the visible and infrared wavelength bands.

According to another embodiment, a two-material prism comprises a first prism element comprising Aluminum Oxynitride. The two-material prism further comprises a second prism element comprising Strontium Titanate. An associated face of the first prism element is contacting an associated face of the second prism element, such that light dispersed through both the first prism element and the second prism element has a dispersive characteristic suitable for operation in a visible to short-wave infrared wavelength band.

Other aspects and embodiments will become apparent from the following detailed description, the accompanying drawings, and the appended claims.

BRIEF DESCRIPTION OF THE DRAWINGS

Various features of embodiments of this disclosure are shown in the drawings, in which like reference numerals designate like elements.

DETAILED DESCRIPTION

Figure 1:
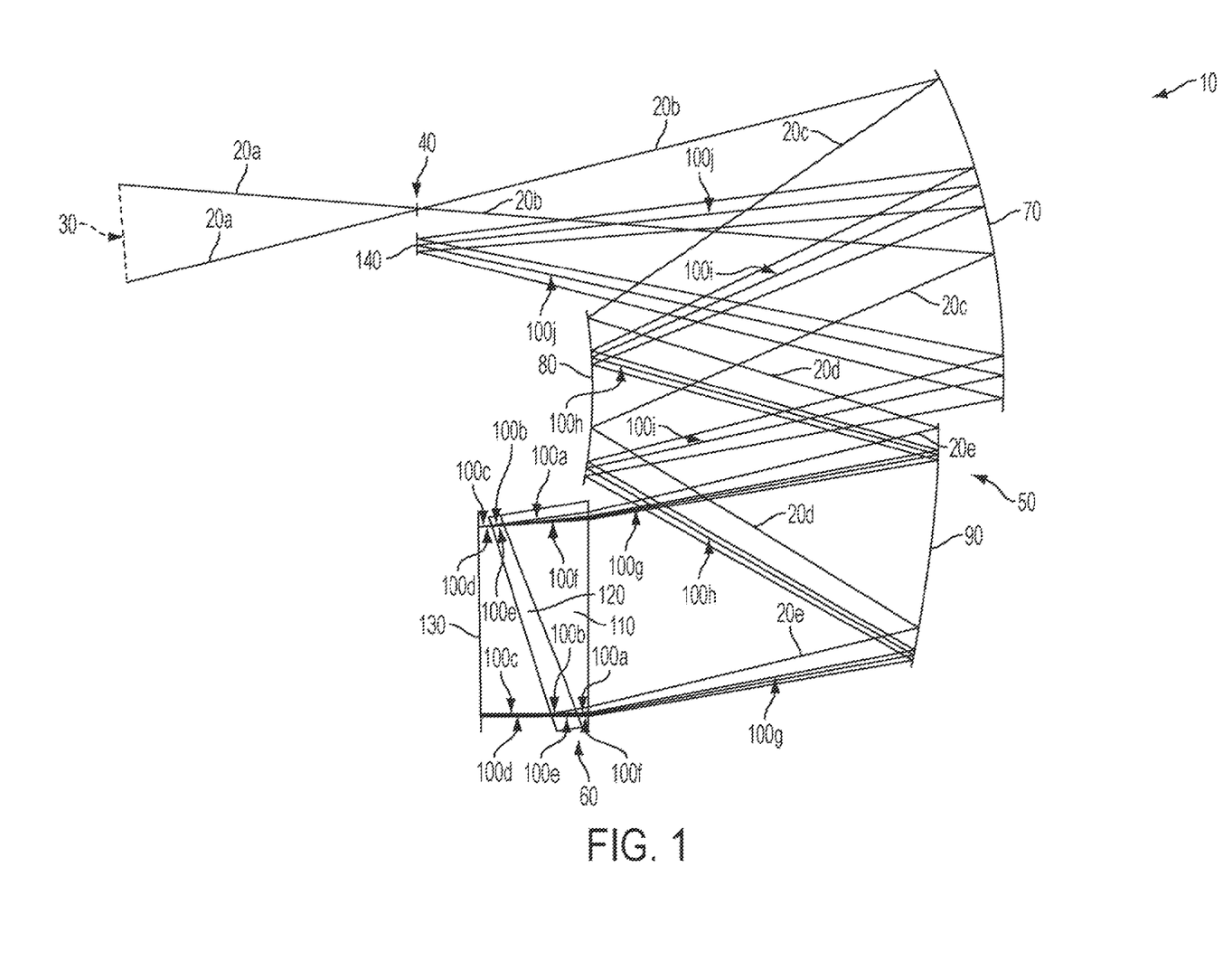
FIG. 1 shows spectrometer of the present disclosure having a two-material prism and optics arranged in a double pass configuration.

FIG. 1 illustrates a ray trace diagram for spectrometer 10, configured to disperse incident electromagnetic radiation 20 for imaging, measurement, or other spectral analysis. Spectrometer 10 may be utilized in any environment, including space-based operations, air-based operations, and ground-based operations. Electromagnetic radiation 20 received by spectrometer 10 (i.e. electromagnetic radiation 20 emitted or reflected by a target for spectrometer 10) may additionally be from any location, including space, air, or ground, regardless of the environment for spectrometer 10 itself.

Spectrometer 10 may comprise fore-optics, which are not shown in FIG. 1, that form pupil 30. Pupil 30 may be formed from any optical arrangement configured to focus electromagnetic radiation 20a at slit 40. As non-limiting examples, the fore-optics may include lenses, mirrors, and/or filters. Where the fore-optics comprises a telescope, the arrangement of the fore-optics may be of any suitable configuration, including but not limited to refractor telescopes (dioptrics), reflector telescopes (catoptrics), or combinations thereof (catadioptrics). Any number of optics arrangements may further be used, including but not limited to Galilean, Newtonian, or Cassegrain configurations. In an embodiment, the fore-optics may form pupil 30 to direct electromagnetic radiation 20 (as electromagnetic radiation 20a) onto slit 40, so that slit 40 may take a slice of the image through pupil 30 for spectral analysis.

Once electromagnetic radiation 20 passes through slit 40 (as electromagnetic radiation 20b), it may diverge onto optics 50 for spectrometer 10. Optics 50 may be of any suitable configuration suitable to direct electromagnetic radiation 20 through spectrometer 10, at least through prism 60, described in greater detail below. Optics 50 can be of any construction or configuration, including, in an embodiment, comprising a double pass collimating and imaging optical system. As shown in the illustrated embodiment, optics 50 may form a reflective triplet, and thus may include primary mirror 70, secondary mirror 80, and tertiary mirror 90.

In an embodiment, such as that shown, primary mirror 70 may be a positive powered mirror, which may have a conic or higher order aspheric configuration. As shown, primary mirror 70 may be configured to receive electromagnetic radiation 20b diverging from slit 40, and redirect the electromagnetic radiation 20 (as electromagnetic radiation 20c) onto secondary mirror 80. Secondary mirror 80 may be a negative powered mirror, positioned substantially on-axis to receive electromagnetic radiation 20c from primary mirror 70, and reflect the electromagnetic radiation 20 (as electromagnetic radiation 20d) onto tertiary mirror 90. Tertiary mirror 90 may be positioned to redirect electromagnetic radiation 20 (as electromagnetic radiation 20e) from secondary mirror 80 through prism 60, whereby it is dispersed into spectra 100. In an embodiment, the combination of primary mirror 70, secondary mirror 80, and tertiary mirror 90 may be configured to collimate electromagnetic radiation 20, such that rays of electromagnetic radiation 20 are parallel as they move through optics 50 towards prism 60.

As depicted in FIG. 1, prism 60 is a two-material prism having first prism element 110 and second prism element 120. The shapes of first prism element 110 and second prism element 110 may vary in different embodiments, and, in some cases, may be optimized based on the computations of a ray trace program. In contrast to the glassy or amorphous nature of conventional prism materials, one or both of first prism element 110 and second prism element 120 comprise materials that are non-amorphous and crystalline in their configuration. In an embodiment, first prism element 110 comprises a crystalline crown material. The crown material of first prism element 110 may be any number of suitable crowns in accordance with the present disclosure, configured to disperse electromagnetic radiation 20 (i.e. electromagnetic radiation 20e received by prism 60 from tertiary mirror 90). In various embodiments, first prism element 110 may be formed from or comprise a crystalline crown such as Sapphire (i.e. Aluminum Oxide, or $Al_2O_3$), Spinel (i.e. Magnesium Aluminum Oxide, or $MgAl_2O_4$), Aluminum Oxynitride (AlON), or Magnesium Oxide (MgO). Second prism element 120 comprises a crystalline flint material, which may counteract excessive relative dispersion of electromagnetic radiation 20 by the crown material of first prism element 110 at certain wavelengths, as will be described in greater detail below. In various embodiments, second prism element 120 may be formed from or comprise a flint such as Zinc Sulfide (in particular water-free Zinc Sulfide, also known as clear Zinc Sulfide, or ClZnS, such as that marketed as CLEARTRAN™), Strontium Titanate (SrTi), or Silver Chloride (AgCl).

The effect of electromagnetic radiation 20 passing through first prism element 110 and second prism element 120 is described in greater detail below. In general terms, however, the direction of first prism element 110 and second prism element 120 will oppose one another, such that the dispersion of electromagnetic radiation 20 into spectra 100 by first prism element 110 will be counteracted by second prism element 120. As shown in FIG. 1, first prism element 110 may be a stronger prism by angle, while second prism element 120 may be a weaker prism by angle. In an embodiment, such as that illustrated in FIG. 1, first prism element 110 is weaker in terms of dispersion (i.e., by being a crown, would have an Abbe number approximately greater than 50), while second prism element 120 is stronger in terms of dispersion (i.e., by being a flint, would have an Abbe number approximately less than 50). In other embodiments, depending on the optical arrangement and configuration of spectrometer 10, first prism element 110 may be a flint prism that is weaker by angle, while second prism element 120 may be a crown prism that is stronger by angle. In context of the crowns and flints described above, Sapphire, Spinel, Aluminum Oxynitride, and Magnesium Oxide, as crowns, have Abbe numbers between approximately 70 and 55, while water clear Zinc Sulfide, Strontium Titanate, and Silver Chloride, as flints, have Abbe numbers below 25.

First prism element 110 and second prism element 120 may be joined by any suitable method or configuration. For example, in an embodiment, first prism element 110 may directly contact second prism element 120, such that intermolecular forces hold their contacting portions together (i.e. an optical contact bond). In other embodiments, the elements may be bonded together by any sort of transparent bonding agent. In some embodiments, there may be a minute air-space between first prism element 110 and second prism element 120. For example, in an embodiment, first prism element 110 and second prism element 120 may be separated by an air space of less than approximately 25-50 μm. In an embodiment where, for example, there is an air or bonding material transition between first prism element 110 and second prism element 120, the contacting surfaces of first prism element 110 and second prism element 120 may be coated in an anti-reflective coating, which may prevent undesirable surface reflections between the elements of prism 60.

In the embodiment of FIG. 1, once electromagnetic radiation 20e intercepts first prism element 110, it disperses into spectra 100a. Spectra 100a then intercepts second prism element 120, and is dispersed again as spectra 100b. In the illustrated embodiment, spectra 100b undergoes a further air-solid interface once it exits second prism element 120 as spectra 100c. As the illustrated embodiment depicts, spectrometer 10 further has flat mirror 130 positioned behind prism 60, such that spectra 100c leaving second prism element 120 is reflected back through prism 60 as spectra 100d. In such an embodiment, optics 50 may be optimized for a double pass configuration. In an embodiment, spectra 100d that is reflected off flat mirror 130 re-enters second prism element 120 as spectra 100e, undergoing further dispersion. Additional dispersion occurs when spectra 100e re-enters first prism element 110 as spectra 100f.

Once spectra 100 exits first prism element 110 in the double pass configuration for spectrometer 10 (as spectra 100g), it may be reflected back through optics 50. For example, in the illustrated embodiment, wherein optics 50 are optimized for a double pass configuration, optics 50 may be further configured to redirect spectra 100 to detector 140 of spectrometer 10. Although detector 140 is not shown in FIG. 1 in detail, it may be of any construction or configuration, including but not limited to a focal plane array, a linear array, a photographic plate, a charge coupled device, a CMOS, or any other element configured to receive and detect spectra 100. In the illustrated embodiment, spectra 100g is reflected off of tertiary mirror 90 (as spectra 100h), secondary mirror 80 (as spectra 100i) and primary mirror 70 (as spectra 100j) prior to intercepting detector 140. In an embodiment, detector 140 may be positioned in the same plane as slit 40. In an embodiment, the optics 50 in the reflective triplet configuration reform images of slit 40 offset from slit 40, dispersed according to wavelength.

As may be understood from the view of FIG. 1, spectra 100 (i.e. spectra 100g leaving prism 60 towards detector 140) must be dispersed at an angle different from that of incident electromagnetic radiation 20 (i.e. electromagnetic radiation 20e leaving tertiary mirror 90 towards prism 60). If any wavelength of spectra 100 is not dispersed, and thus the angle of incidence onto prism 60 equals the angle of transmission from prism 60 in the double pass configuration, then that wavelength would not be imaged on detector 140, as it would be reflected back onto slit 40. In an embodiment, detector 140 may be spaced to either side of slit 40, depending on a positive or negative dispersion of spectra 100 for prism 60, and the tilt of mirror 130.

Figure 2:
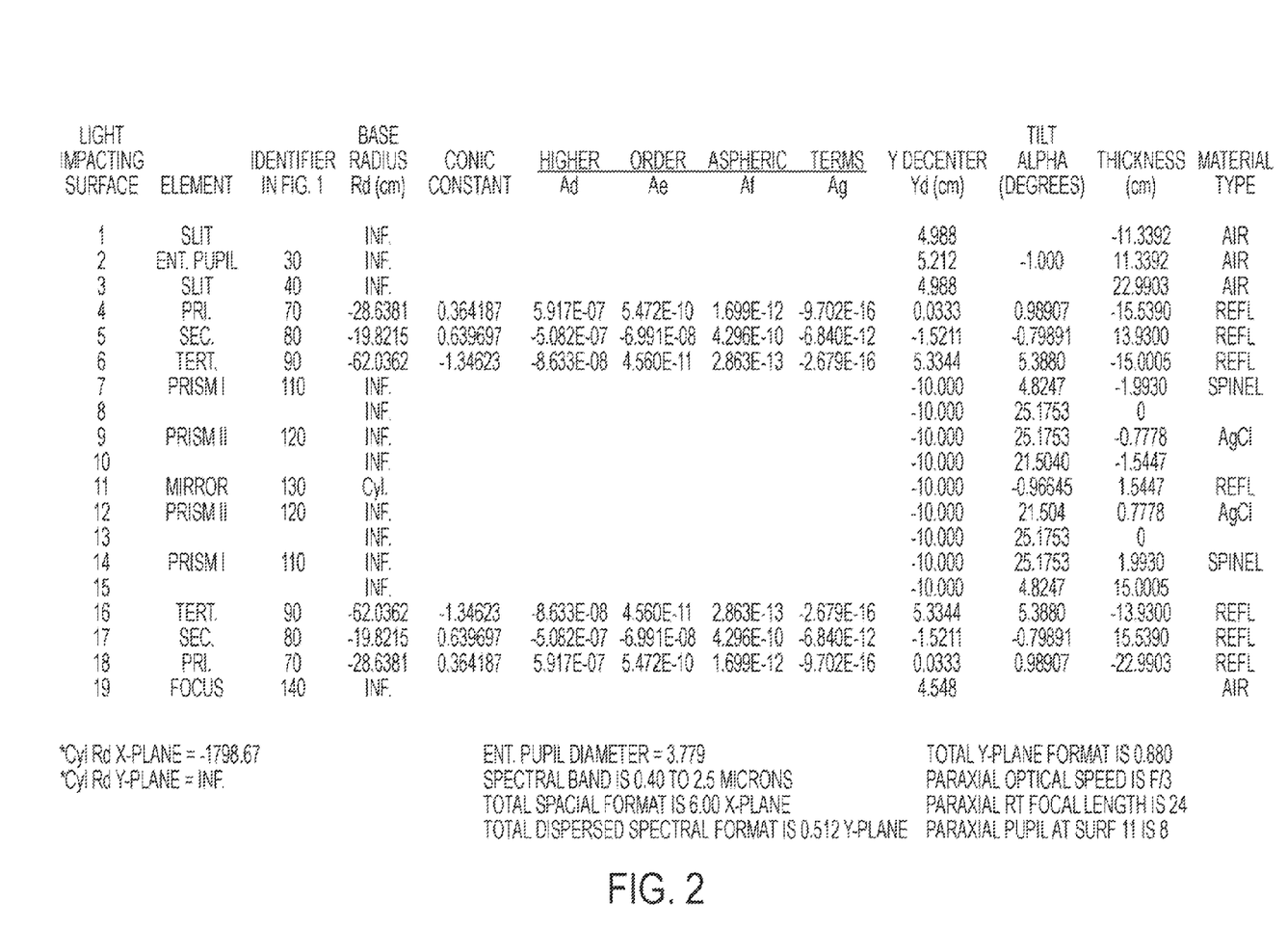
FIG. 2 shows an example prescription for the spectrometer of FIG. 1.

The data in the table of FIG. 2 provides an example of an optical prescription for spectrometer 10 in FIG. 1. It is to be understood, however, that the spectrometer 10 is not limited to the configuration described in the prescription of FIG. 2, and that the prescription of FIG. 2 provides details for only one possible embodiment of spectrometer 10. Other prescriptions describing the spacings between and characteristics of primary mirror 70, secondary mirror 80, and tertiary mirror 90, as well as the materials and surface angles of first prism element 110 and second prism element 120 may also or alternatively be utilized.

Figure 3:
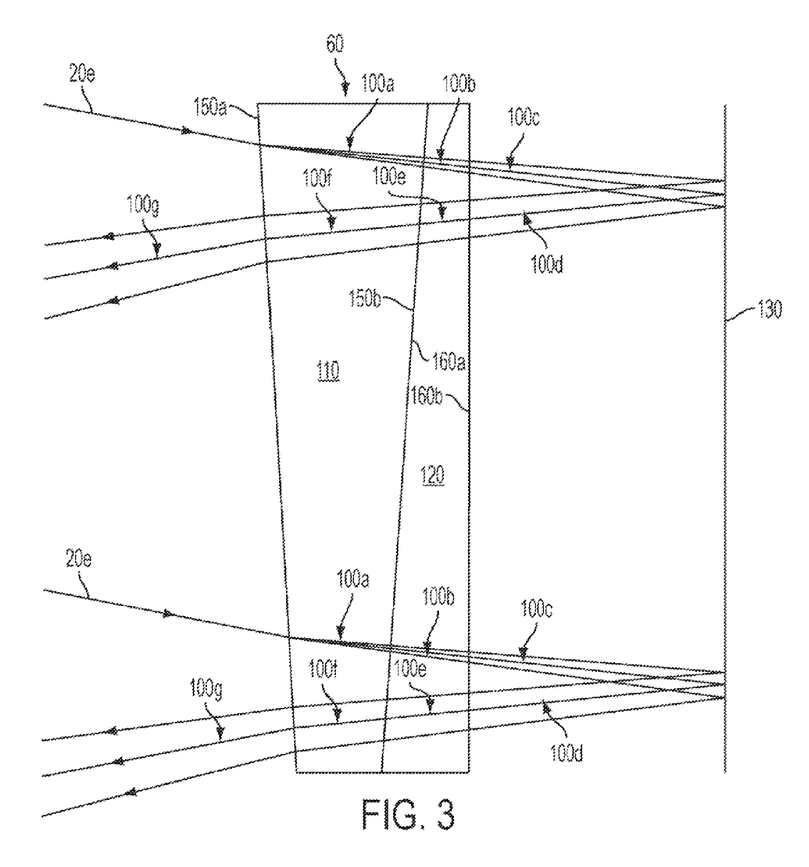
FIG. 3 shows the two-material prism of the spectrometer of FIG. 1 having a mirror arranged in a minimum deviation configuration.

An enlargement of an embodiment of prism 60 is shown schematically in FIG. 3. Although the shape of prism 60 is modified for clarity, it can be seen that electromagnetic radiation 20e disperses into spectra 100a upon impacting first face 150a of first prism element 110. Further divergence of the angle of spectra 100a occurs again as spectra 100a crosses out of second face 150b of first prism element 110, into first face 160a of second prism element 120, as spectra 100b. In the illustrated embodiment, spectra 100b may undergo additional divergence as spectra 100b exits second face 160b of second prism element 120, as spectra 100c, wherein it may impact flat mirror 130. The spacing between second prism element 120 and flat mirror 130 may place spectrometer 10 in a minimum deviation configuration. Such spacing between flat mirror 130 and prism 60 has the benefit of allowing a tilt to be applied to flat mirror 130, which may be useful in fine tuning the return angle of spectra 100c (as spectra 100d), allowing for flatter dispersion over a target band of wavelengths, as is discussed in greater detail below. A downside to this spaced flat mirror 130 configuration is the presence of four air-solid interfaces for prism 60, which may reduce transmission by some amount as compared to a rear surface reflection configuration, described below. The additional air-solid interfaces can be seen as spectra 100d, reflected off of flat mirror 130 travels through the air to intercept second face 160b of second prism element 120, traversing through second prism element 120 as spectra 100e and first prism element 110 as spectra 100f (through first face 160a of second prism element 120 and second face 150b of first prism element 110), before re-entering the air again as it exits first face 150a of first prism element 110 as spectra 100g.

When prism 60 and flat mirror 130 are spaced such that spectrometer 10 is approximately in a minimum deviation configuration, the distance from prism 60 to flat mirror 130 may be arbitrarily established. By minimum deviation, it may be understood that the orientation (by angle) of prism 60 is configured to minimize the total angular deviation between the electromagnetic radiation 20 and/or spectra 100 as it enters and exits the prism 60. Put another way, the entering ray angle (relative to the entrance face surface normal) is approximately equal to the exiting ray angle (relative to the exiting face surface normal). In yet other words, the ray bending occurring at the entrance face of prism 60 is approximately equal to the ray bending at the exit face of prism 60. In an embodiment, flat mirror 130 may be spaced as close as possible to prism 60 without their respective mountings interfering with one another, or other elements of spectrometer 10. While the distance between prism 60 and flat mirror 130 does not generally affect the operation of spectrometer 10, the tilt of flat mirror 130 affects the final location of spectra 100. Additionally, the angles and tilts of prism 60, affect both the final dispersion and location of spectra 100. Therefore, in an embodiment, both the angles and tilts of prism 60, and the tilt of flat mirror 130, may be optimized to obtain a desired dispersion, dispersion flatness, and final location for spectra 100.

Figure 4:
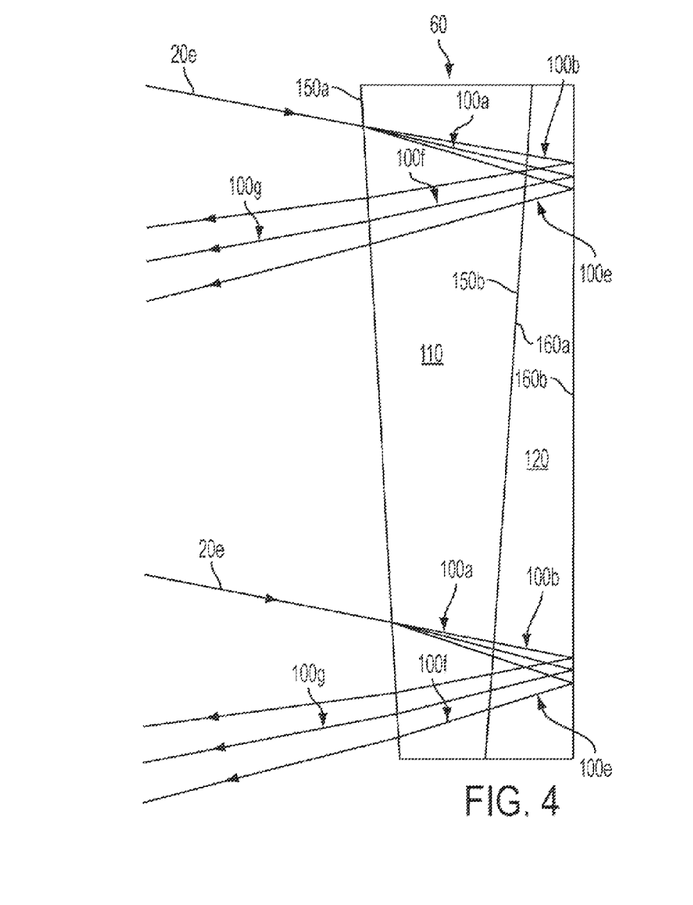
FIG. 4 shows the two-material prism of the spectrometer of FIG. 1 having a mirror arranged in a rear surface reflection configuration.

In an alternative embodiment of spectrometer 10, flat mirror 130 may be omitted, and a portion of prism 60 may provide the reflection for the double pass system of optics 50. As shown in the schematic view of FIG. 4, second face 160b of second prism element 120 may be mirrored (i.e. coated with a reflective material, such as a metal layer or a multilayer dielectric coating) to provide a rear surface reflection configuration for prim 60. While such a configuration may provide a less flat dispersion over the target band of wavelengths, as discussed in greater detail below, the configuration has the benefit of having only two air-solid interfaces, which may result in higher overall transmission efficiency for spectra 100. As seen in the figure, electromagnetic radiation 20e intercepts first face 150a of first prism element 110, and traverses first prism element 110 as spectra 100a. After crossing through second face 150b of first prism element 110 and first face 160a of second prism element 120, spectra 100b reflects from mirrored second face 160b of second prism element 120, immediately reflecting back through second prism element 120 as spectra 100e. As such, there is no air-solid transition occurring such as would occur if spectra 100b exited through second face 160b, only to subsequently re-enter following a subsequent reflection. Spectra 100e would then cross first side 160a and second side 150b of second prism element 120 and first prism element 110 respectively, before traversing first prism element 110 as spectra 100f, and exiting first side 150a as spectra 100g, making the second air-solid transition of the rear-surface reflection configuration of prism 60.

Figure 5:
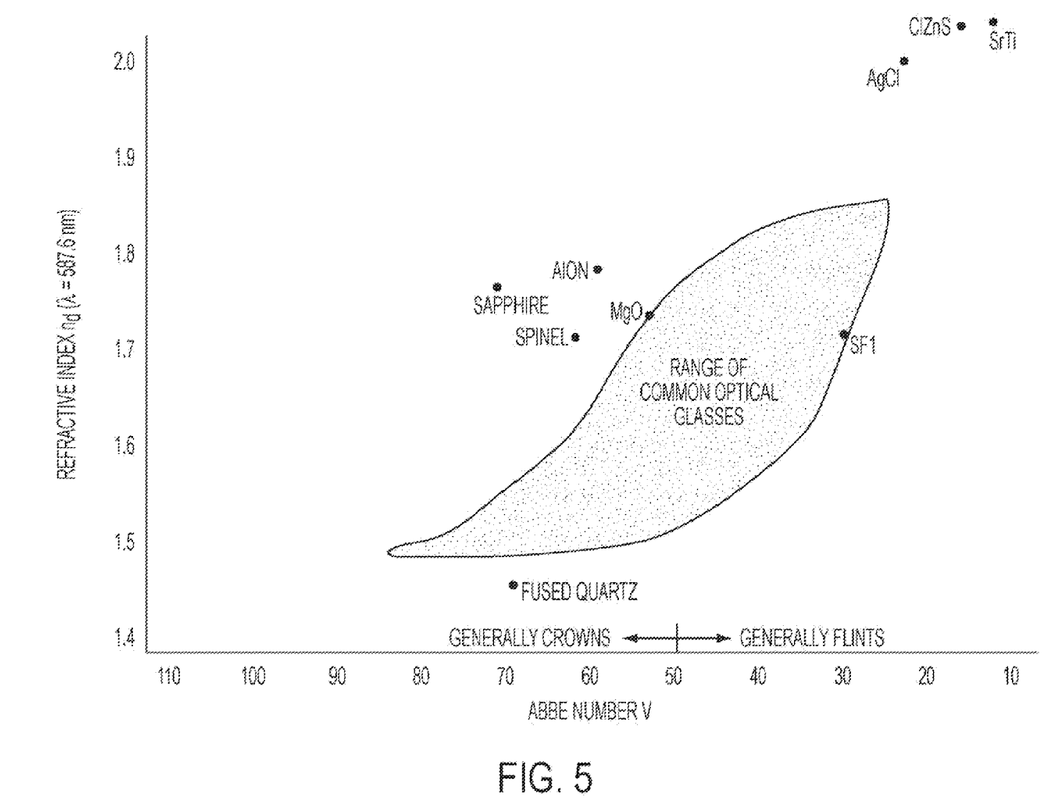
FIG. 5 shows a plot of the refractive index versus Abbe number for a variety of crown and flint materials.

As noted above, the material selection for both the crown of first prism element 110 and the flint of second prism element 120 plays an important role in maintaining a flat relative dispersion (i.e. change in refractive index) of spectra 100 through a desired wavelength band. In some embodiments, the crowns and flints may exhibit characteristics that distinguish them from common optical materials, which are typically amorphous or glassy. For example, as is plotted in FIG. 5, the materials described above may generally be outside the range of common optical glasses such as SF1, in terms of Abbe number verses refractive index. The selection of such materials may have a beneficial effect on the relative dispersion of electromagnetic radiation dispersed therethrough. The relative dispersion of spectra 100 may be characterized as the separation at an image of spectra 100 between two wavelengths separated by 10 nm. In the plots of FIGS. 6A-C through FIG. 7, and FIG. 9, the relative dispersion on the Y-axis may be characterized as having the units "cm/10 nm", indicating spatial separation in cm per 10 nm of wavelength separation.

Figure 6A:
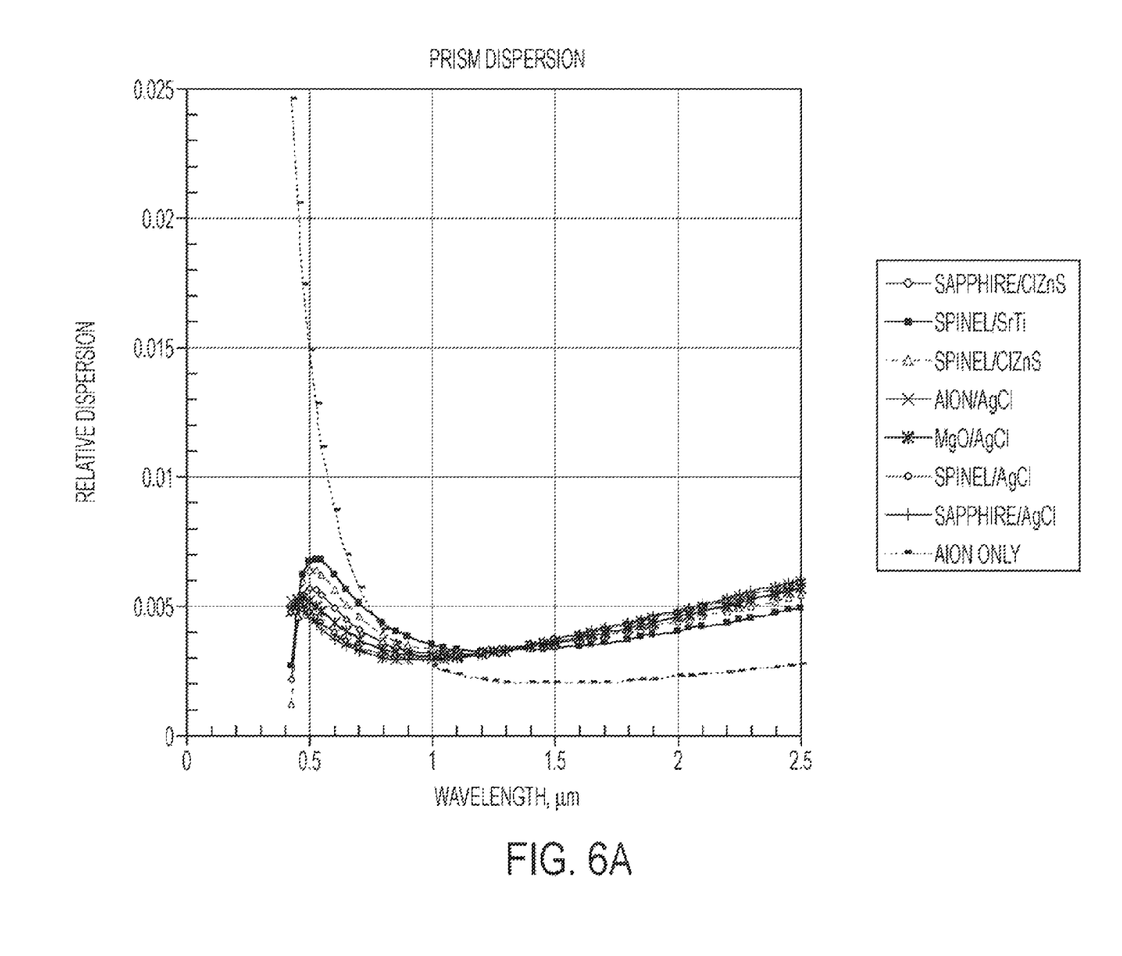
FIG. 6A shows a graph depicting relative dispersion over a band of wavelengths for different material selections for two-material prisms, as compared to an example one-material prism.

If a spectrometer is configured to observe spectra in the visible and short-wave infrared wavelength bands (i.e. is a hyperspectral instrument), some materials or material pairs may work well in the short wave infrared, however they may provide excessive dispersion in the visible portion of the spectrum. For example, as seen in FIG. 6A, which plots relative dispersion compared to wavelength for a variety of material pairs, while AlON by itself shows a drastic change in dispersion as the wavelength drops below 1 μm, the relative dispersion is relatively constant for wavelengths above 1 μm. Such changes in relative dispersion below 1 μm may be countered by pairing crown materials with flint materials, as evidenced by the dispersion plot for the material pair of AlON with AgCl.

Figure 6B:
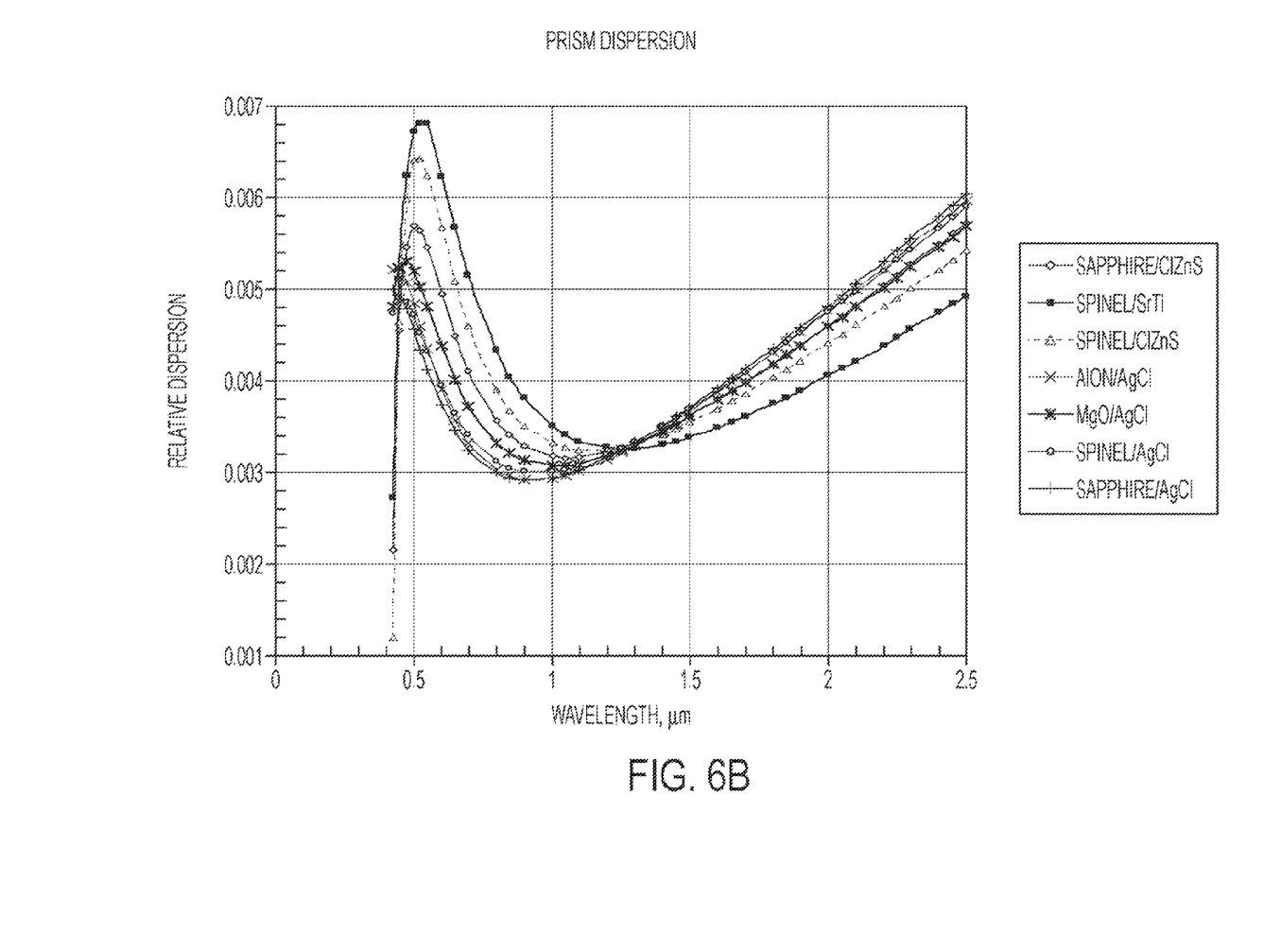
FIG. 6B shows a re-scaled view of the graph of FIG. 6A, omitting the example one-material prism to enhance the plot for the two-material prisms.

In the enlarged view of FIG. 6B, which re-plots the data of FIG. 6A in a closer scale by omitting AlON by itself, it is seen that countering the dispersion of the first material in first prism element 110 with a second material in second prism element 120 may result in too much dispersion in the other direction. As an example, the plot of Spinel and ClZnS (i.e. water free or "clear" Zinc Sulfide) is shown to have a relatively large change in dispersion between approximately 0.4 μm and 0.5 μm due to this combination. On the other hand, combinations such as Spinel and AgCl maintain a flatter dispersion curve across the full 0.4 μm to 2.5 μm spectral range, representing the visible through short-wave infrared wavelength bands. By having a flatter dispersion, either fewer pixels on detector 140 are required to fully record the range of wavelengths at a specified average spectral bandwidth, or the average spectral bandwidth is reduced given a fixed number of pixels on detector 140. In both cases, performance of spectrometer 10 is improved. In some cases, the flatness of the dispersion may be characterized by the maximum relative dispersion over the preferential wavelength bands, as compared to the minimum relative dispersion over the preferential wavelength bands. For example, in FIG. 6B, the combination of Spinel/AgCl has a maximum relative dispersion (at 2.5 μm) of approximately 0.006, while its minimum relative dispersion (at 0.9 μm) is approximately 0.003, providing flatness of approximately 2:1. This would be superior to material pairs such as Spinel/ClZnS material pair, which has a maximum relative dispersion of 0.0064 and a minimum relative dispersion of 0.0012, leading to a flatness of approximately 5.3:1.

Figure 6C:
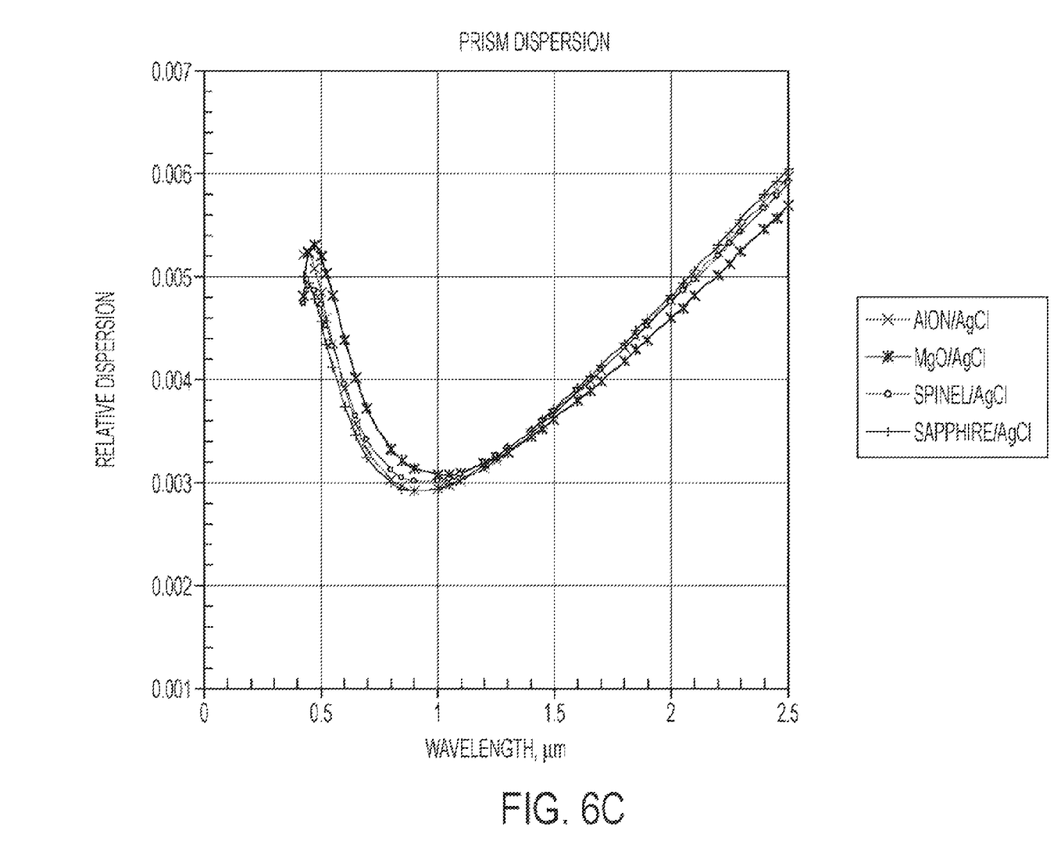
FIG. 6C replots the graph of FIG. 6B, omitting those material pairs that do not utilize Silver Chloride as the flint material.
Figure 7A:
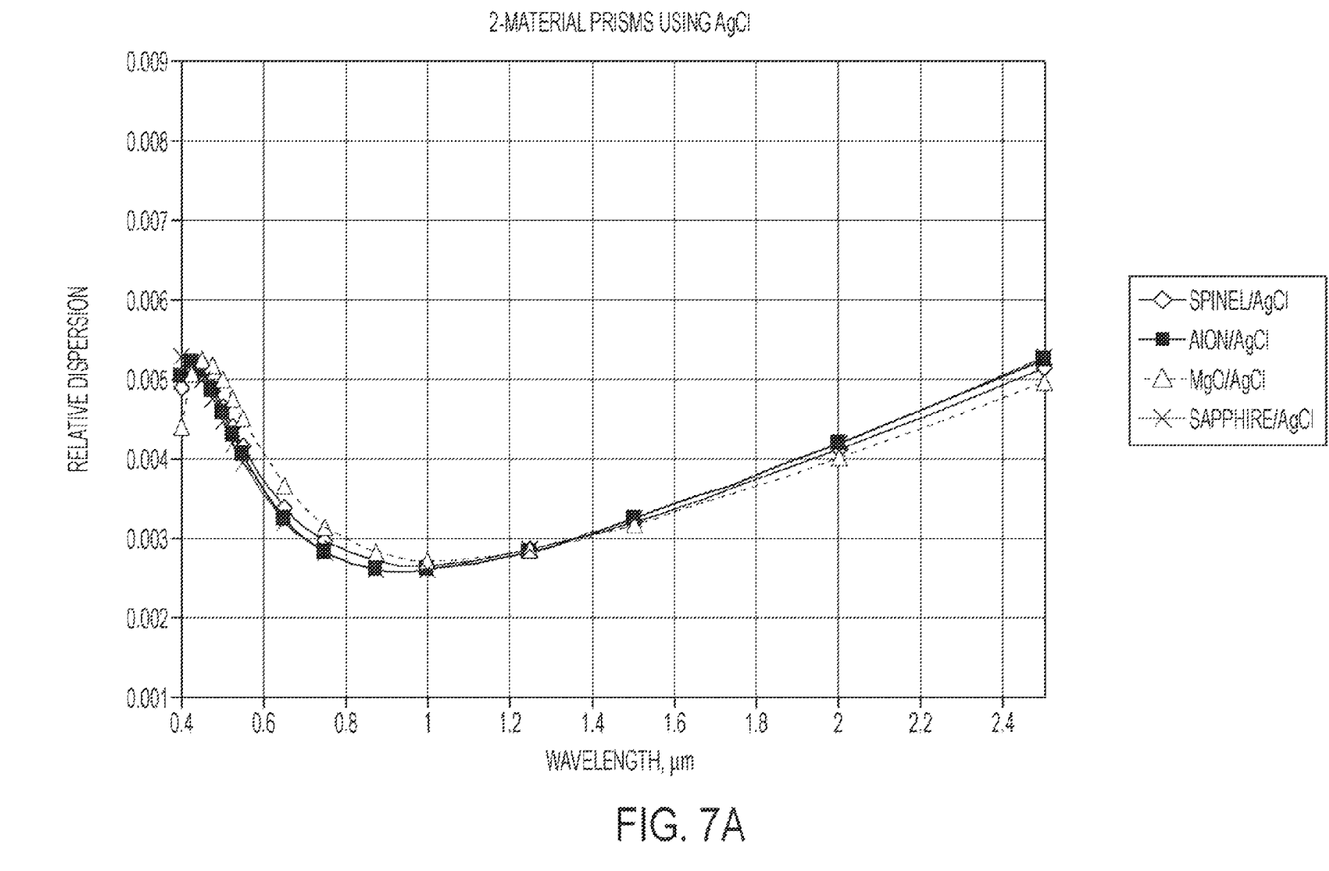
FIG. 7A plots relative dispersion versus wavelength for another example of a two-material prism configuration, using the two-material combinations with Silver Chloride as the flint material depicted in FIG. 6C.
Figure 7B:
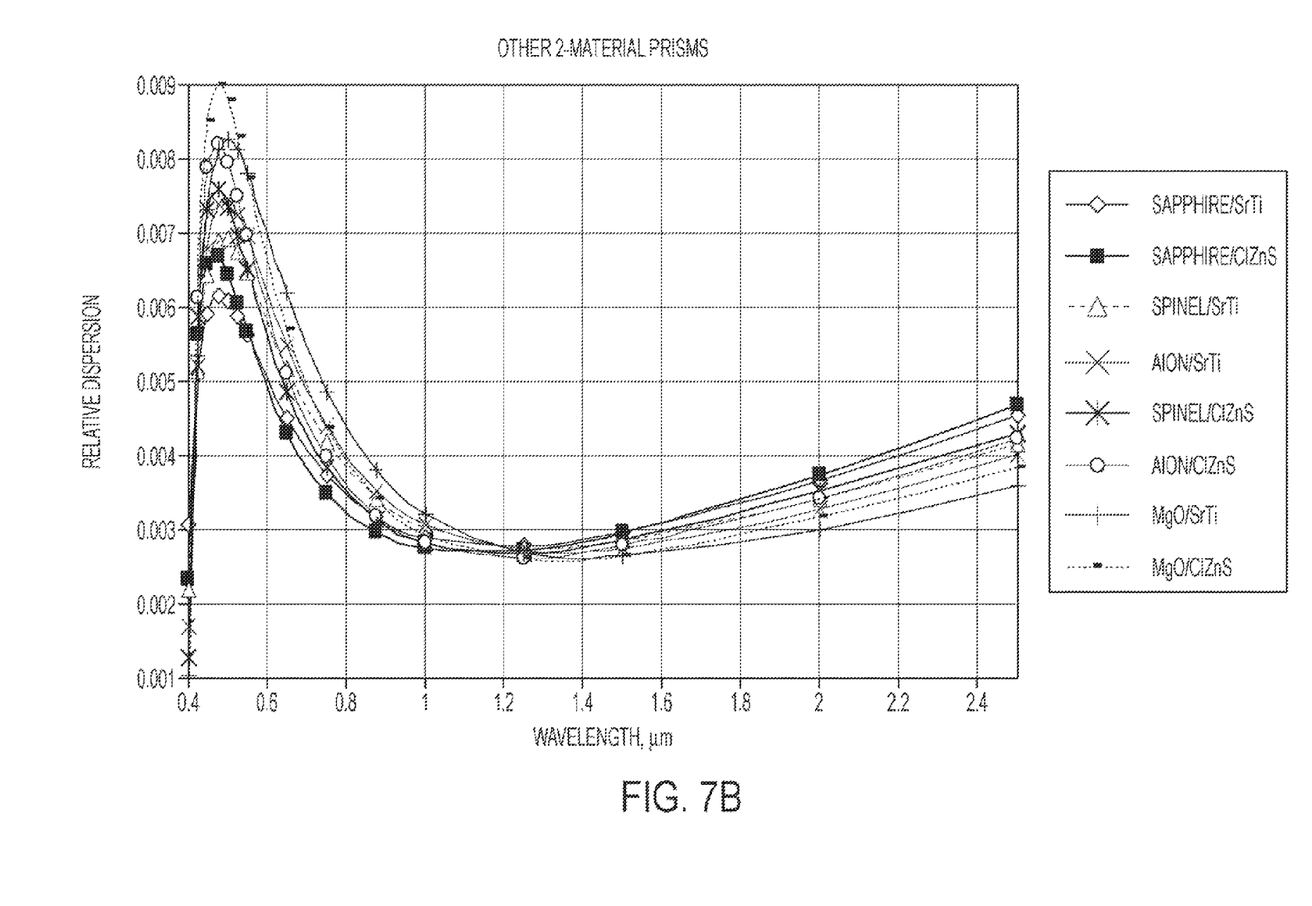
FIG. 7B plots relative dispersion versus wavelength for the example of the two material prism configuration of FIG. 7A, however utilizing different two-material pairs that do not utilize Silver Chloride as the flint material.
Figure 8:
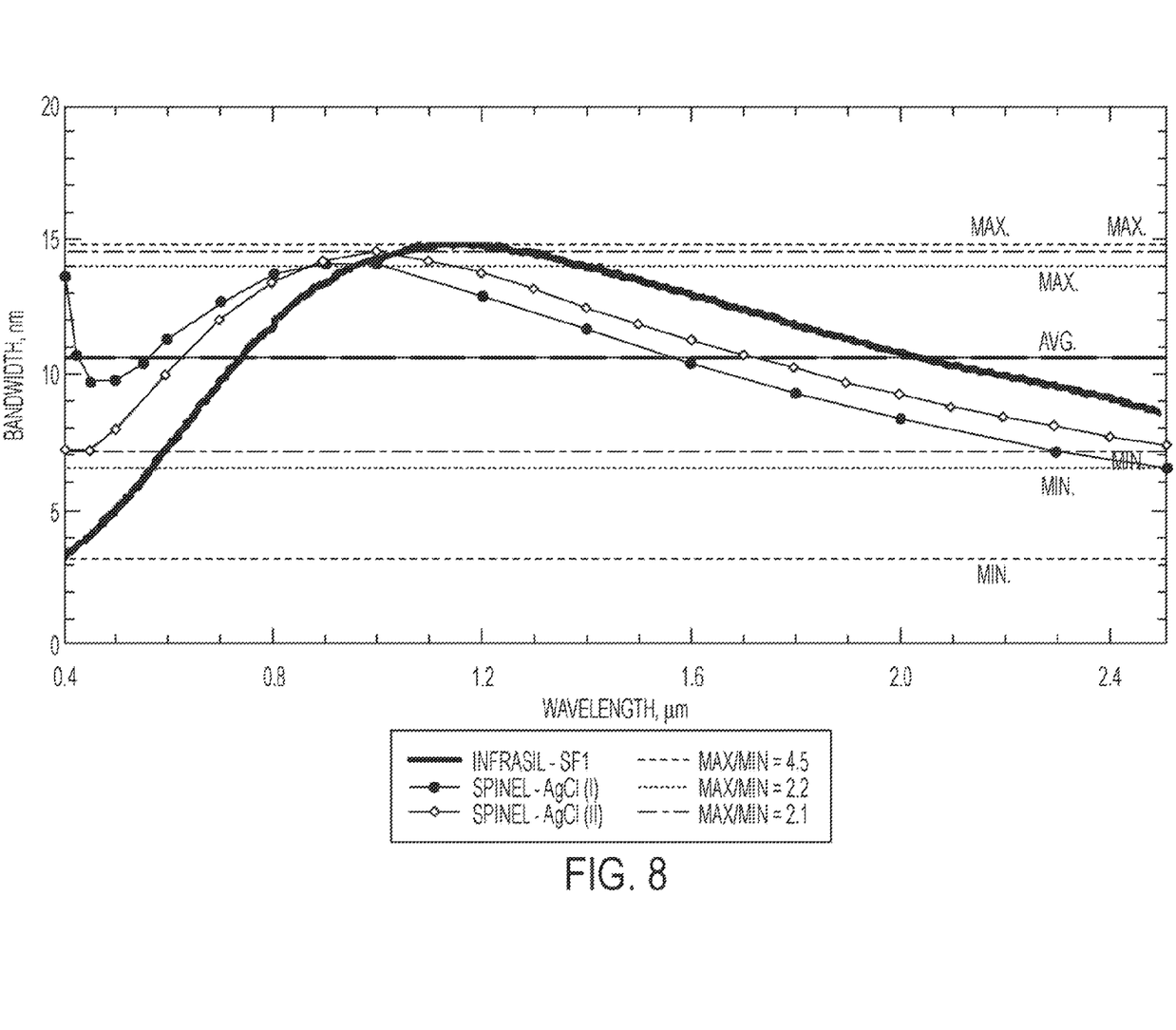
FIG. 8 plots the bandwidth as a function of wavelength for embodiments of conventional and Silver Chloride based two-material prisms.

In FIG. 6C the data of FIG. 6B is replotted, omitting those material pairs that do not utilize Silver Chloride as the flint material. As can be appreciated from the Figure, the utilization of Silver Chloride as the flint material yields similar levels of relative dispersion as a factor of wavelength of light for all crown materials shown. FIGS. 7A and 7B show relative dispersion versus wavelength for a slightly different configuration of two-material prism, in a number of crown/flint pairs. By different configuration, it is understood that the angles and weighting of the optical elements may be modified, so as to provide optimization for a different arrangement and mounting of the optical elements. In some embodiments, these modifications may comprise one or more of altering the angles of the outer faces of first prism element 110 and/or second prism element 120 with respect to their contacting faces, or modifying the angle or orientation of prism 60 relative to the entering and exiting electromagnetic radiation 20/spectra 100. In some cases, the dispersion in the shorter wavelength region (i.e. around approximately 0.4 μm) may be more greatly altered by these modifications, however they may also alter the location of the peak dispersion to some degree. FIG. 7A depicts Spinel, AlON, MgO and Sapphire crowns in combination with Silver Chloride as the flint. FIG. 7B shows those crowns in combination with SrTi and water clear ZnS (ClZnS). In comparing the utilization of material pairs having Silver Chloride as the flint material versus the other material pairs, it is apparent that Silver Chloride is an excellent choice for the flint material in two-material prism spectrometers, and may provide a flatter dispersion over a range of wavelengths. As previously indicated, and as is shown in greater detail in the graph of FIG. 8, having a flat dispersion over a wide wavelength band may correlate to less spectral bandwidth at detector 140. In particular, FIG. 8 depicts the bandwidth verses wavelength for two embodiments utilizing the material pair of Spinel/AgCl, as compared to Infrasil/SF1, a conventional (i.e. glassy/amorphous) material pair. In an embodiment, the dispersion peak for the prism may be optimized or tuned, such as through ray tracing computer simulations, to provide different optimal dispersion effects, which may be useful depending on different variations of the optical arrangement and mountings in spectrometer 10, or for different detectors 140.

Figure 9:
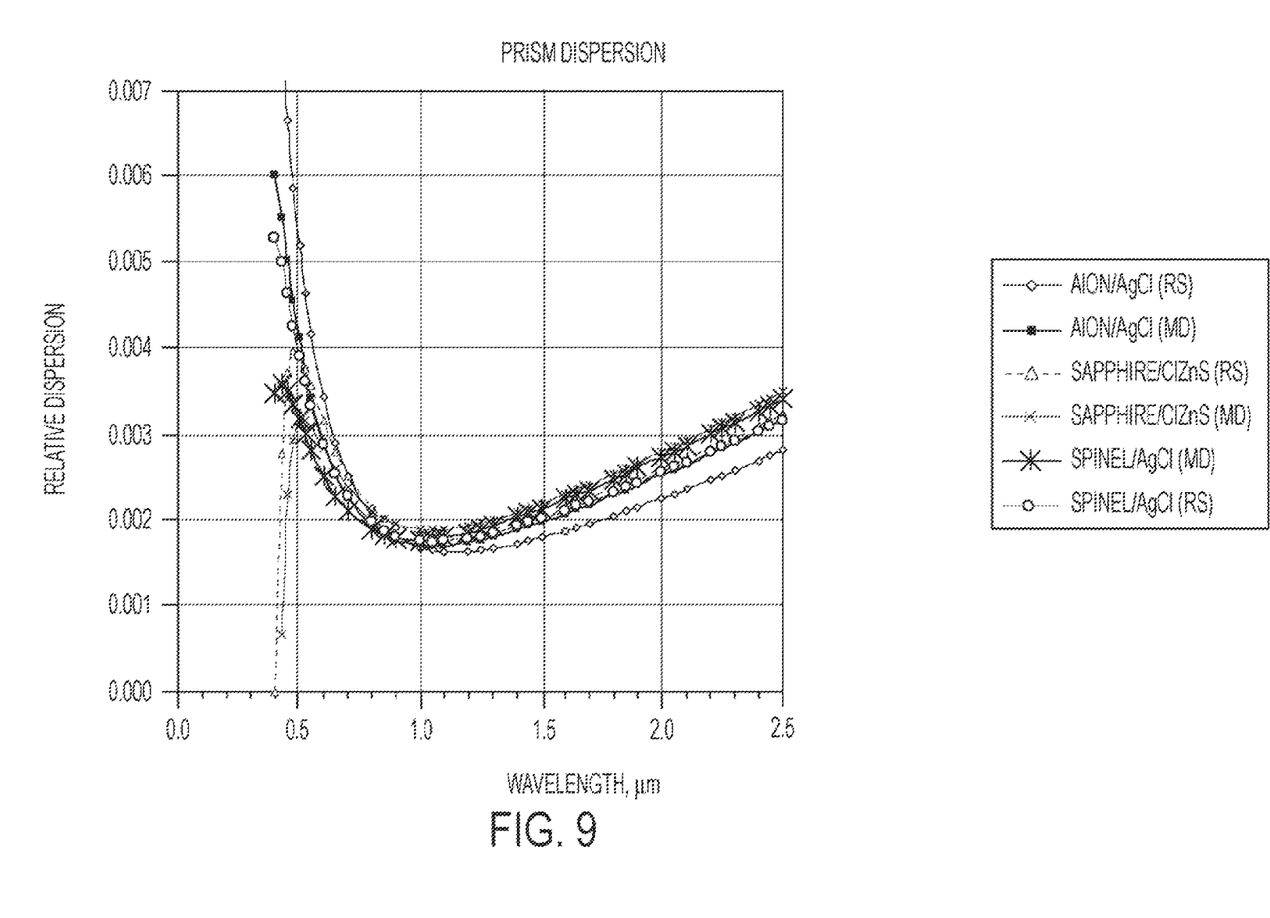
FIG. 9 shows the relative dispersion over a band of wavelengths for a variety of two-material pairs, highlighting the effect of different reflection configurations for the prisms.

As is shown in the graph of FIG. 9, relative dispersion may vary depending on the configuration of prism 60 in terms of whether flat mirror 130 is providing reflection spaced from prism 60, allowing the tilt of flat mirror 130 to permit a minimum deviation configuration, or whether second face 160b of second prism element 120 is mirrored, such that the "tilt" of the reflecting surface is equal to the angle of second face 160b. As may be appreciated, the ability to optimize the reflective surface of flat mirror 130 in the minimum deviation (MD) configuration of the Spinel/AgCl material pair generally provides a much flatter dispersion than the rear surface (RS) reflection configuration.

While certain embodiments have been shown and described, it is evident that variations and modifications are possible that are within the spirit and scope of the inventive concept as represented by the following claims. For example, in some embodiments, a third material (i.e. either another crown or another flint material) may be utilized in prism 60, and may further flatten the relative dispersion over a desired wavelength band. The disclosed embodiments have been provided solely to illustrate the principles of the inventive concept and should not be considered limiting in any way.

What is claimed is:

1. A spectrometer comprising:
   a detector array;
   a prism comprising:
      a first prism element comprising a crystalline crown material; and
      a second prism element contacting the first prism element, the second prism element comprising a crystalline flint material; and,
   optics configured to direct light at least twice through the prism;
   wherein the prism is configured to disperse light received from the optics at an incident angle therethrough into a constituent spectra in visible and infrared wavelength bands, the spectra being dispersed from the prism at angles offset from the incident angle;
   wherein the constituent spectra are directed onto the detector array with approximately equal dispersion across the visible and infrared wavelength bands.

2. The spectrometer of claim 1, further comprising a mirror configured such that the constituent spectra leaving the prism are reflected by said mirror back through said prism.

3. The spectrometer of claim 2, wherein said mirror is spaced apart from the prism.

4. The spectrometer of claim 2, wherein said mirror is in contact with a face of the prism to perform rear surface reflection within the prism.

5. The spectrometer of claim 2, wherein the optics are arranged in a double pass configuration, such that the constituent spectra reflected by said mirror are reflected through said optics onto the detector.

6. The spectrometer of claim 1, wherein the crown material and the flint material are selected to achieve a relative dispersion for the prism of between approximately 0.001 and 0.008 across a wavelength band of extending from approximately 0.4 μm to approximately 2.5 μm, so as to provide a dispersion characteristic suitable for operation in a visible to short-wave infrared wavelength band.

7. The spectrometer of claim 6, wherein the crown material and the flint material are selected to achieve a relative dispersion for the prism of between approximately 0.0025 and 0.006 across a wavelength band of extending from approximately 0.4 μm to approximately 2.5 μm, so as to provide a dispersion characteristic suitable for operation in a visible to short-wave infrared wavelength band.

8. The spectrometer of claim 1, wherein the crystalline crown material and the crystalline flint material respectively define a crown/flint pair, the crown/flint pair being selected from the group consisting of $Al_2O_3$ and ZnS, $MgAl_2O_4$ and SrTi, $MgAl_2O_4$ and ZnS, AlON and AgCl, MgO and AgCl, $MgAl_2O_4$ and AgCl, or $Al_2O_3$ and AgCl.

9. The spectrometer of claim 1, wherein the crystalline crown material comprises Aluminum Oxynitride, and the crystalline flint material comprises Strontium Titanate.

10. The spectrometer of claim 1, wherein the crystalline flint material comprises Silver Chloride.

11. The spectrometer of claim 10, wherein the crystalline crown material comprises Spinel.

12. The spectrometer of claim 1, wherein the crystalline crown material and the crystalline flint material respectively define a crown/flint pair, the crown/flint pair being $MgAl_2O_4$ and SrTi, or AlON and AgCl.

13. A spectrometer comprising:
   a detector array;
   a two-element prism comprising:
      a first prism element comprising a crystalline crown material; and
      a second prism element contacting the first prism element, the second prism element comprising a crystalline flint material; and,
   optics configured to direct light at least twice through the two-element prism;
   wherein the two-element prism is configured to disperse light received from the optics at an incident angle therethrough into constituent spectra in a wavelength band extending from approximately 0.4 μm to 2.5 μm, the spectra being dispersed from the prism at angles offset from the incident angle;
   wherein the constituent spectra are directed onto the detector array with approximately equal dispersion across the wavelength band.

14. The spectrometer of claim 13, wherein the crystalline crown material and the crystalline flint material respectively define a crown/flint pair, the crown/flint pair being selected from the group consisting of $MgAl_2O_4$ and SrTi, Aluminum Oxynitride and Strontium Titanate, or AlON and AgCl.

* * * * *